United States Patent
May et al.

(10) Patent No.: US 6,732,263 B1
(45) Date of Patent: May 4, 2004

(54) CONFIGURING BOTH A PROGRAMMABLE LOGIC DEVICE AND ITS EMBEDDED LOGIC WITH A SINGLE SERIALIZED CONFIGURATION BIT STREAM

(75) Inventors: Roger May, Bicester (GB); Andrew Draper, Bucks (GB)

(73) Assignee: Altera Corporation, San Jose, CA (US)

( * ) Notice: Subject to any disclaimer, the term of this patent is extended or adjusted under 35 U.S.C. 154(b) by 492 days.

(21) Appl. No.: 09/668,704

(22) Filed: Sep. 22, 2000

Related U.S. Application Data

(60) Provisional application No. 60/211,094, filed on Jun. 12, 2000.

(51) Int. Cl.[7] .................. G06F 15/177; H03K 19/177
(52) U.S. Cl. ............................................ 713/1; 326/41
(58) Field of Search ................. 713/1; 326/41

(56) References Cited

U.S. PATENT DOCUMENTS

| | | | |
|---|---|---|---|
| 5,892,961 A | | 4/1999 | Trimberger |
| 6,134,707 A | * | 10/2000 | Herrmann et al. .......... 717/139 |
| 6,191,614 B1 | * | 2/2001 | Schultz et al. ................. 326/41 |
| 6,259,271 B1 | * | 7/2001 | Couts-Martin et al. ....... 326/40 |
| 6,363,019 B1 | * | 3/2002 | Erickson et al. ....... 365/189.07 |

FOREIGN PATENT DOCUMENTS

EP 486991 A2 * 5/1992 ......... H03K/19/177

OTHER PUBLICATIONS

Alan McKenzie, et al.: "A Versatile Application Bootload for Field Programmable SOC" *Motorola Technical Developments* vol. 39, pp. 77–79, Sep. 1999.
"AT94K Series Field Programmble System Level Intergrated Circuit: Advance Information", *Atmel Corp.* 1999.
"CS2000 Reconfigurable Communications Processor Family Product Brief" *Chameleon Software Inc.*, pp. 1–8, 2000.
"Wireless Base Station Design Using Reconfigurable Communication Processors", *Chameleon Software Inc.*, pp. 1–8, 2000.
"Triscend E5 Configurable System–on–Chip Family" *Triscend Corporation*, pp. 1–90, 2000.

* cited by examiner

*Primary Examiner*—Thomas Lee
*Assistant Examiner*—Eric Chang
(74) *Attorney, Agent, or Firm*—Townsend and Townsend and Crew LLP

(57) ABSTRACT

A method and apparatus for configuring a digital system having a programmable logic device and embedded logic from a configuration source that supplies a single serialized configuration bit stream for configuring both the programmable logic device and the embedded logic.

11 Claims, 3 Drawing Sheets

CONFIGURING BOTH A PROGRAMMABLE LOGIC DEVICE AND ITS EMBEDDED LOGIC WITH A SINGLE SERIALIZED CONFIGURATION BIT STREAM

CROSS-REFERENCES TO RELATED APPLICATIONS

This application claims priority from provisional U.S. patent application Ser. No. 60/211,094, filed Jun. 12, 2000 and which is incorporated by reference into this application for all purposes.

A related application is filed concurrently with the present application as U.S. patent application Ser. No. 09/668,665 in the names of May et al. and entitled "Bus Architecture for System on a Chip" and assigned to the present assignee. Another related application is filed concurrently with the present application as U.S. patent application Ser. No. 09/668,202 in the names of May et al. and entitled "A Fully Re-Configurable Memory Map" and assigned to the present assignee.

BACKGROUND OF THE INVENTION

The present invention relates to integrated circuits. More specifically, the present invention is directed at configuring a PLD having embedded logic.

A programmable logic device (PLD) is an integrated circuit, which can be customized by a system designer to perform different logical functions. PLDs combine the advantages of fixed integrated circuits with the flexibility of custom integrated circuits. By using these devices, custom logic functions can be designed and fabricated in-house, while eliminating long engineering lead times, high tooling costs, and dedicated inventory problems associated with custom devices. Furthermore, the design can be easily changed without upsetting design schedules and purchase agreements.

PLDs often comprise a plurality of generic logic blocks that may be arbitrarily programmed and interconnected to each other. These blocks may be implemented using volatile memory such as static random access memory (SRAM) or, alternatively, with nonvolatile memory such as erasable programmable read only memory (EPROM), electrically erasable programmable read only memory (EEPROM), fuses, and antifuses. If the programmable elements are volatile memories, the memory cells must be configured upon system power-up in order for the device to operate as desired. This is typically done by loading configuration data from an external configuration source into the PLD. The configuration source may be, for example, a nonvolatile memory such as a FLASH memory. Configuration of the PLD is accomplished by transferring the configuration data from the configuration source to the PLD.

Recently, there has been a trend to embed other logic devices such as within a PLD. Embedded devices (i.e. "embedded logic") may comprise control logic and other application specific logic devices such as, volatile memory, non-volatile memory, cache, etc. and are embedded prior to configuration of the programmable logic core. A processor (or central processing unit CPU)) may also comprise part of the embedded logic. A processor is an integrated circuit implemented on a semiconductor chip, which typically includes, among other things, an instruction execution unit, register file, arithmetic logic unit (ALU), multiplier, etc. Processors are found in digital systems, such as personal computers for executing instructions, and can also be employed to control the operation of most digital devices.

While the addition of embedded logic has proven to be desirable, there remains a it need of a method for setting up (i.e., configuring) embedded logic devices, in addition to configuring the PLD core.

SUMMARY OF THE INVENTION

The following detailed description and the accompanying drawings provide a better understanding of the nature and advantages of the present invention.

In a first aspect of the present invention, a method of configuring a system having a programmable logic device and embedded logic is disclosed. The method includes the step of supplying a single serialized configuration bit stream to the system. The bit stream is characterized by a unique protocol and includes a first configuration data section for configuring the programmable logic device and a second configuration data section for configuring the embedded logic.

In a second aspect of the invention a digital system having a programmable logic device and embedded logic coupled to the programmable logic device is disclosed. A configuration source is provided to supply a single serialized configuration bit stream for configuring both the programmable logic device and the embedded logic.

In a third aspect of the invention, a configuration apparatus for providing configuration data to a system on a chip is disclosed, the system including embedded logic and a programmable logic device. The configuration apparatus comprises a configuration data bit stream register having a header including an address field containing an address of a logic device within the embedded logic, and a data field containing data configuration data for configuring the logic device.

The following detailed description and accompanying drawings provide a better understanding of the nature and advantages of the present invention.

DESCRIPTION OF THE SPECIFIC EMBODIMENTS

Figure 1:
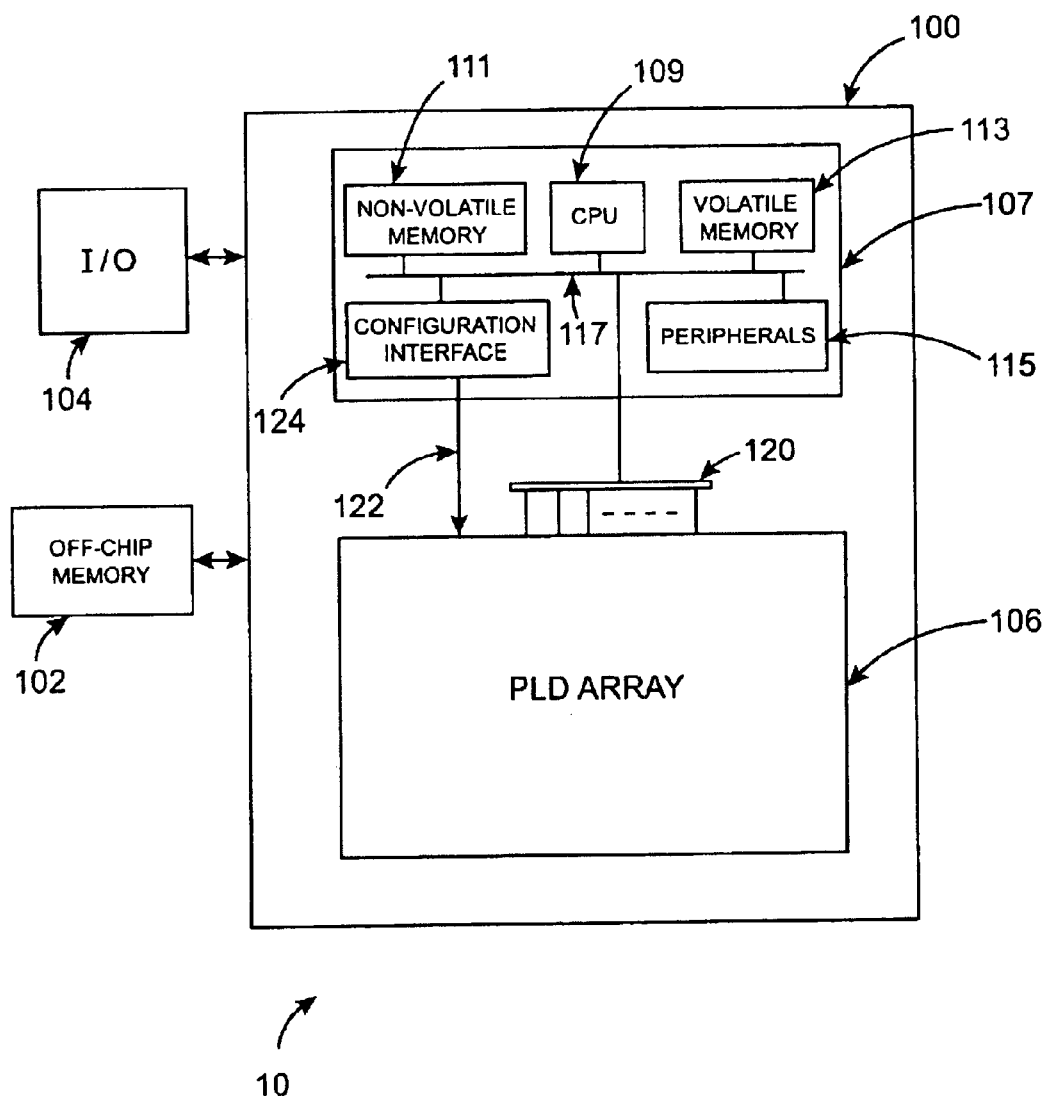
FIG. 1 shows a block diagram of a digital system, according to an embodiment of the present invention.

FIG. 1 shows a block diagram of a digital system within which the present invention may be embodied. The system may be provided on a single board, on multiple boards, or even within multiple enclosures. FIG. 1 illustrates a system 10 in which a programmable logic device 106 may be utilized. Programmable logic devices are currently represented by, for example, Altera's MAX®, FLEX®, and APEX™ series of PLDs. System 10 may be a digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, and others.

In the exemplary embodiment of FIG. 1, a semiconductor device 100 is coupled to a memory 102 and an I/O 104 and comprises a programmable logic device (PLD) 106 and embedded logic 107, which may include, among other components, a CPU (or processor) 109, non-volatile memory 111, volatile memory 113 and other peripherals 115. PLD array 106 and all of the embedded logic resources are coupled to a system bus 117.

Figure 2:
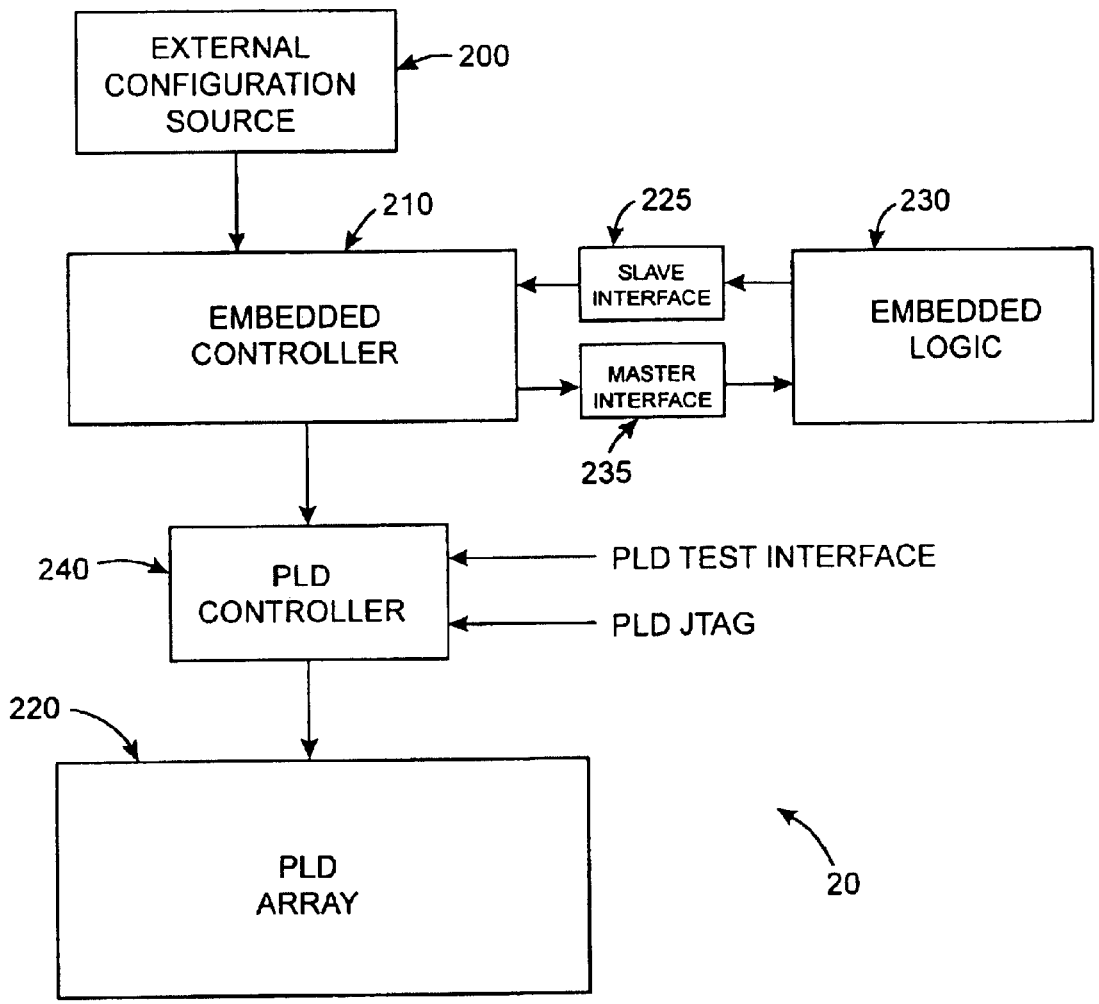
FIG. 2 shows an exemplary configuration logic block diagram, according to an embodiment of the present.

Referring now to FIG. 2, there is shown a block diagram showing an exemplary configuration logic block diagram, according to an embodiment of the present invention. Embedded controller 210 is configured to accept configuration data from one of two sources, external configuration source 200 or slave interface 225. External configuration source 200 can provide the configuration data and may be stored in a memory such as, but not limited to, RAM, cache memory, hard disk drives, floppy disk, CDROM, etc.

In one embodiment, configuration data can be presented in the form of a serial bit stream, according to the following format: <address, [length], data, [CRC]>. As an example, for a $2_n$ address space, the address field would be expressed as an n-bit word, the length field would identify the number of n-bit words comprising the configuration data and the data field would comprise the serial stream of n-bit configuration data words. The CRC (cyclic redundancy check) field is used for data protection.

In one embodiment, the configuration data comprises two main sections: configuration data for PLD array 220 and configuration data for embedded logic 230. In accordance with this, a first configuration data bit stream is sent to embedded logic 230 first, via master interface 235, and then, optionally, a second configuration data section is sent to PLD array 220, via PLD controller 240. Transfer of the configuration data to PLD controller 240 may be in the form of a serial bit stream mode or in the form of a parallel synchronous mode. This embodiment is illustrated in FIG. 1 where a parallel interface 120 to PLD array 106 (via system bus 117) is shown as well as a serial interface 122 to PLD array 106 via a configuration interface 124. Serial mode is used for all transfers while parallel synchronous mode is used for configuration data received from slave interface 225. PLD array 220 may also be configured by use of an industry standard protocol such as, for example, JTAG (IEEE Standard 1149.1).

In an alternative embodiment, any of the resources of embedded logic 230 may be configured and/or the PLD array 220 may be configured, in any order. For example, in one embodiment a processor of embedded logic 230 may be configured without configuring PLD array 220 and then configuration of PLD array 220 could be performed from an external source, such as external memory, internal memory or the Internet. In yet another embodiment a user could disable embedded logic 230, either circuit by circuit or in total.

The complete set of configuration data for configuring the embedded logic (e.g. on-chip RAM) is preferably contained within a configuration data file stored, for example, in external configuration source 200. In this exemplary embodiment, the configuration data file comprises a configuration file header, followed by a configuration file preamble, followed by an options register. Configuration data is then presented, followed by an end of file (EOF) block, which signifies that the configuration data for embedded logic is complete. Finally, the configuration file ends with a configuration file postamble.

The address field preferably has certain control bits, which are descriptive of the data. For an exemplary 32-bit address field, addresses are multiples of four. So the least two significant bits of an address field may be used for other purposes. (A similar situation is the case for larger or smaller address field sizes.) For the 32-bit example, bit 0 (i.e. the least significant bit) may, depending on whether its value is 1 or 0, indicate that either the next word holds a data length value or that the length value has been omitted. Another bit, for example bit 1, may indicate that a CRC follows the data. The configuration file header, configuration file preamble and configuration file postamble are comprised of a set number of bits having a predefined bit pattern, e.g. 111 . . . 111 (16 bits, all 1's), 01000110 (8 bits).

The options register, as referred to above, comprises part of the configuration data file. On power up, all bits of the options register are preferably reset (e.g. to all 1's). Following power up, the serial data stream determines the values of these bits. The options register contains a predetermined number of bits, which indicate, for example, whether PLD configuration data follows the current transfer, how the system responds to a configuration error (i.e shut-down or auto-configure), the compatibility and identification of programmer object files (POFs). By default, the value of option register bit 0 bit is set such that it indicates PLD configuration data follows the current transfer. However, this bit may optionally be set to indicate to the embedded controller that there is no PLD configuration data following the current transfer.

Figure 3:
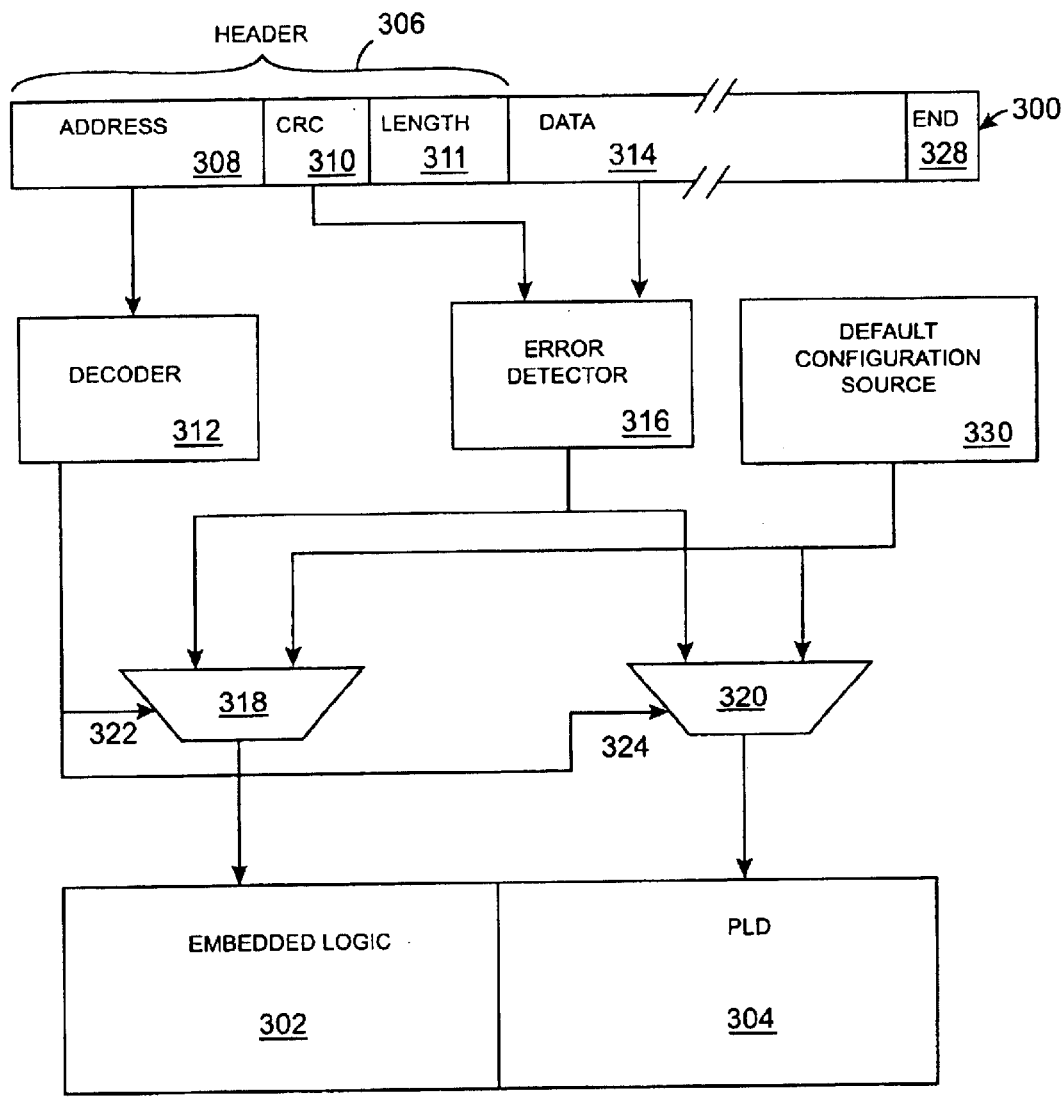
FIG. 3 shows an exemplary configuration apparatus, according to an embodiment of the present invention.

Referring now to FIG. 3, there is shown another embodiment 30, according to the present invention. Embodiment 30 comprises a serial bit stream 300 register containing configuration information for configuring embedded logic 302 and/or a PLD 304. In an exemplary embodiment, PLD 304 and embedded logic 302 are disposed on a single semiconductor chip. The configuration information comprises a header including an address field 308, CRC field 310 and length field 311. Length field 311 contains information on the length of the configuration data. Address field 308 is received by a decoder 312, which determines what system resource is to be configured. A system resource may be PLD 304 or a logic device within embedded logic 302. CRC data in CRC field 310 and configuration data 314 are supplied to an error detector 316. If no error is detected by error detector 316, configuration data 314 is transferred to multiplexers 318 and 320, which are controlled by decoder 312 at control inputs 322 and 324, respectively. Which multiplexer 318 or 320 is enabled is determined by address information supplied from address field 308 and decoded by decoder 312. If the decoded address information identifies a logic device within embedded logic 302, multiplexer 318 is selected, thereby allowing configuration data to be transferred to the associated logic device in embedded logic 302. On the other hand, if the decoded address information identifies PLD 304 then multiplexer 320 is selected to allow the configuration data to be transferred to PLD 304. In any case, transfer of data is completed by the detection of end of data bits(s) in an end field, which are concatenated to the configuration data. In the absence of a configuration data bit stream, in an alternative embodiment configuration data may be supplied by a default configuration source 330 so that, for example, the system can be automatically setup during power up or after a reset condition.

The configuration logic function described above may also comprise a processor boot load/source function, which tells the processor whether it should boot from Flash memory or from on-chip RAM. If boot from Flash is the boot mode, configuration data is received after the processor has booted. For boot from on-chip RAM mode, the processor is held in a reset condition until configuration data is received to configures PLD array 220 and configuration data is received for setting up on-chip RAM and/or registers within the embedded logic, which may specify, for example, a memory map for the system. Following configuration under this mode, the processor is released to boot.

In conclusion, the present invention discloses method and apparatus for configuring both a PLD array and embedded logic from a single serial bit stream. The foregoing description of preferred exemplary embodiments has been presented for the purposes of description. It is not intended to be exhaustive or to limit the invention to the precise form described herein, and modifications and variations are possible in light of the teaching above. Accordingly, the true scope and spirit of the invention is instead indicated by the following claims and their equivalents.

What is claimed is:

1. A method of configuring a system having programmable logic device and embedded logic, the method comprising:

supplying a single serialized configuration bit steam to the system the bit stream comprising a first configuration data section for configuring the programmable logic device and a second configuration data section for configuring the embedded logic;

selectively coupling the first configuration data section to the programmable logic device during a first time period through a first multiplexer in response to a first decoded address signal; and selectively coupling the second configuration data section to the embedded logic during a second period of time through a second multiplexer in response to a second decoded address signal.

2. A digital system, comprising:

a programmable logic device;

embedded logic coupled to the programmable logic device, wherein a configuration source is provided to supply a single serialized configuration bit stream for configuring both the programmable logic device and the embedded logic;

an error detection circuit that receives the single serialized bit stream from a serial bit strewn register;

a first multiplexer having an input coupled to the error detection circuit to receive the serialized bit stream and an output coupled to the embedded logic; and a second multiplexer having an input coupled to the error detection circuit to receive the serialized bit stream and an output coupled to the programmable logic device.

3. The system of claim 2, wherein the programmable logic device and embedded logic are disposed on a single semiconductor chip.

4. The system of claim 2, wherein the single serialized bit stream is comprised of:

a first header identifying the embedded logic;

a first address field identifying a resource in the embedded logic that is being configured;

a first stream of configuration data for configuring the resource; and a first end of file indicator for indicating that the first stream of configuration data has been transferred to the resource.

5. The system of claim 4, wherein the single serialized bit stream is comprised of:

a second header identifying the programmable logic device;

a second address field identifying a resource in the programmable logic device that is being configured;

a second stream of configuration data for configuring the resource; and a second end of file indicator for indicating that the second stream of configuration data has been transferred to the resource.

6. A digital system, comprising:

a programmable logic device;

embedded logic coupled to the programmable logic device, the embedded logic having a central processing unit, wherein a configuration source is provided to supply a single serialized configuration bit stream for configuration the embedded logic;

an error detection circuit coupled to receive and detect errors in the single serialized bit stream;

a first multiplexer having a first input coupled to the error detect circuit to receive the serialized bit stream and an output coupled to the embedded logic; and a second multiplexer having a first input coupled to the error detection circuit to receive the serialized bit stream and an output coupled to the programmable logic device.

7. The system of claim 6, wherein the programmable logic device and embedded logic are disposed on a semiconductor chip.

8. The system of claim 7, wherein programmable logic configuration data is supplied from an external source to configure the programmable logic device.

9. The digital system of claim 6 further comprising:

an address decoder coupled to select inputs of the first and the second multiplexers.

10. The system of claim 6, wherein the single serialized configuration bit stream is comprised of:

a first header identifying the embedded logic;

a first address field identifying a resource in the embedded logic that is being configured;

a first stream of configuration data for configuring the resource; and a first end of file indicator for indicating that the first stream of configuration data has been transferred to the resource.

11. The system of claim 6 further comprising:

a default configuration source coupled to a second input of the multiplexer and a second input of the second multiplexer.

* * * * *